(12) United States Patent
Yellowhair et al.

(10) Patent No.: US 8,582,092 B1
(45) Date of Patent: Nov. 12, 2013

(54) ALIGNMENT AND FOCUS OF MIRRORED FACETS OF A HELIOSTAT

(75) Inventors: Julius E. Yellowhair, Albuquerque, NM (US); Clifford Kuofei Ho, Albuquerque, NM (US); Richard B. Diver, Albuquerque, NM (US); Timothy A. Moss, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 265 days.

(21) Appl. No.: 13/085,118

(22) Filed: Apr. 12, 2011

Related U.S. Application Data

(63) Continuation-in-part of application No. 12/689,798, filed on Jan. 19, 2010, now Pat. No. 8,294,886, which is a continuation-in-part of application No. 11/761,396, filed on Jun. 12, 2007, now Pat. No. 7,667,833.

(60) Provisional application No. 61/241,047, filed on Sep. 10, 2009, provisional application No. 60/817,160, filed on Jun. 28, 2006.

(51) Int. Cl.
 *G01B 11/26* (2006.01)
(52) U.S. Cl.
 USPC ............. 356/138; 356/152.2; 126/602; 372/9
(58) Field of Classification Search
 USPC .................................. 356/138, 152.2; 126/602
 See application file for complete search history.

(56) References Cited

U.S. PATENT DOCUMENTS

| | | | | |
|---|---|---|---|---|
| 5,861,947 | A | * | 1/1999 | Neumann ...................... 356/216 |
| 5,862,799 | A | * | 1/1999 | Yogev et al. .................. 126/578 |
| 6,532,953 | B1 | * | 3/2003 | Blackmon et al. ............ 126/685 |
| 6,597,709 | B1 | | 7/2003 | Diver, Jr. |
| 6,899,096 | B2 | | 5/2005 | Nakamura |
| 6,984,050 | B2 | | 1/2006 | Nakamura |
| 7,207,327 | B2 | | 4/2007 | Litwin et al. |
| 2009/0249787 | A1 | | 10/2009 | Pfahl et al. |
| 2010/0265602 | A1 | | 10/2010 | Lata Perez |
| 2011/0000478 | A1 | | 1/2011 | Reznik |

OTHER PUBLICATIONS

Richard L. Wood, "Distant Observer Techniques for Verification of Solar Concentrator Optical Geometry", Solar Energy Research Institute, 1981, UCRL-53220.
M.K. Selcuk, "Parabolic Dish Test Site: History and Operating Experience", Prepared for USDOE through NASA by Jet Propulsion Laboratory, JPL Publication 85-18.

(Continued)

*Primary Examiner* — Tarifur Chowdhury
*Assistant Examiner* — Isiaka Akanbi
(74) *Attorney, Agent, or Firm* — Medley Behrens & Lewis LLC; Michael J. Medley; Olivia J. Tsai

(57) ABSTRACT

Various technologies pertaining to aligning and focusing mirrored facets of a heliostat are described herein. Updating alignment and/or focus of mirrored facets is undertaken through generation of a theoretical image, wherein the theoretical image is indicative of a reflection of the target via the mirrored facets when the mirrored facets are properly aligned. This theoretical image includes reference points that are overlaid on an image of the target as reflected by the mirrored facets of the heliostat. A technician adjusts alignment/focus of a mirrored facet by causing reflected reference markings to become aligned with the reference points in the theoretical image.

20 Claims, 9 Drawing Sheets

(56) References Cited

OTHER PUBLICATIONS

F. R. Livingston, "Activity and Accomplishments in Dish/Stirling electric Power System Development," Prepared for USDOE through NASA by Jet Propulsion Laboratory, JPL Publication 85-8.

T. Wendelin, "Parabolic Trough Optical Characterization at the National Renewable Energy Laboratory," DOE/Solar Program Review Meeting, 2004, DOE/GO-102055-2067, pp. 328-329.

Eckhard Lupfert et al, "Parabolic Trough Analysis and Enhancement Techniques," Proceedings of ISEC2005, 2005 International Solar Energy Conference, Orlando, FL, pp. 1-7.

Hank Price et al, "Advances in Parabolic Trough Solar Power Technology," Journal of Solar Energy Engineering, May 2002, vol. 124 pp. 109-125.

J. B. Blackmon et al, "Application of the Digital Image Readiometer to Optical Measurement and Alignment of Space and Terrestrial Solar Power Systems," $28^{th}$ Intersociety Energy Conversion Engineering Conference Proceedings, IECEC 1993, pp. 2.563-2.570.

R.B. Diver et al, "A New High-Temperature Solar Research Furnace," Journal of Solar Energy Engineering, vol. 105 (1983) pp. 288-293.

M. Shortis et al "Photogrammetry: An Available Surface Characterization Tool for Solar Concentrators, Part II: Assessment of Surfaces", Journal of Solar Energy Engineering, 1997, vol. 119, pp. 286-291.

Richard B. Diver, "Mirror Alignment and Focus of Point-Focus Solar Concentrators" Proceedings of the 1995 ASME/JSME/JSES, International Solar Energy Conference, Maui, HI.

B. L. Butler et al, "Optical Evaluation Techniques for Reflecting Solar Concentrators" SPIE vol. 114 Optics Applied to Solar Energy Conversion (1977), pp. 43-49.

Bridgette J. Steffen et al, "Development and Characterization of a Color 2F Alignment Method for the Advanced Dish Development System", Proceedings of ISEC, International Solar Energy Conference, Hawaii (2003).

Tim Wendelin et al, "Optical Evaluation of Composite-Based Reflector Facets for Parabolic Trough Concentrators", Solar 2004 Conference, Jul. 11-14, Portland, OR, pp. 1-5.

Frank Biggs, et al, "The Helios Model for the Optical Behavior of Reflecting Solar Concentrators" SAND76-0347, 1979.

John A. Duffie et al, "Solar Energy thermal Processes", John Wiley & Sons.

Timoth A. Moss et al, "Final Test Results for the Schott HCE on a LS-2 Collector", SAND2005-4034.

Richard B. Diver, "Mirror Alignment Techniques for Point-Focus Solar Concentrators", SAND92-0668.

Vernon E. Dudley, et al "Test Results SEGS LS-2 Solar Collector" SAND94-1994.

Richard Hartley et al, *Multiple View Geometry in Computer Vision, Second Edition*, Cambridge University Press, 2003, Chapter 10, 3D Reconstruction of Cameras and Structure, pp. 262-278.

Andraka, et al., "Improved Alignment Technique for Dish Concentrators", Proceedings of ISEC 2003, 2003 International Solar Energy Conference, Hawaii, Mar. 2003, pp. 1-9.

\* cited by examiner

ALIGNMENT AND FOCUS OF MIRRORED FACETS OF A HELIOSTAT

CROSS-REFERENCE TO RELATED APPLICATIONS

This application is a continuation-in-part of U.S. patent application Ser. No. 12/689,798, filed on Jan. 19, 2010, which claims the benefit of U.S. Provisional Patent Application No. 61/241,047, filed on Jun. 12, 2007, and U.S. patent application Ser. No. 12/689,798 is a continuation-in-part of U.S. patent application Ser. No. 11/761,396, filed on Jun. 12, 2007. Which is now U.S. Pat. No. 7,667,833, issued on Feb. 23, 2010, which claims the benefit of U.S. Provisional Patent Application No. 60/817,160, filed on Jun. 28, 2006. The entireties of these applications are incorporated herein by reference.

STATEMENT OF GOVERNMENTAL INTEREST

This invention was developed under contract DE-AC04-94AL85000 between Sandia Corporation and the U.S. Department of Energy. The U.S. Government has certain rights in this invention.

BACKGROUND

Solar power towers are utilized to receive concentrated solar radiation to produce high-temperature thermal energy to generate utility-scale electricity or perform solar chemistry. To generate high thermal energy, solar power towers are located in fields that include numerous heliostats that collect and concentrate solar energy onto a central collector (receiver). A heliostat includes, for example, a plurality of mirrored facets on a common frame that has two axis drives, such that the heliostat can track the sun over the course of a day. Current solar power tower fields include hundreds to thousands of heliostats.

To obtain substantially optimal concentrated solar flux on the central collector from a heliostat, the individual mirrored facets are desirably canted as well as focused. With more specificity, heliostats are considered point-focus concentrators. These types of concentrators are typically tested and evaluated at the 2f position, which is at a distance that is twice the focal length away from the concentrator vertex. For heliostats that have very long slant ranges or focal lengths (hundreds of meters), however, the 2f location is not easily accessible. This makes it difficult to measure and evaluate the alignment of the heliostat facets at 2f. Accordingly, other alignment approaches have been considered.

An exemplary approach for aligning mirrored facets in a heliostat is to place the heliostat on sun while covering other heliostats in the field, and then judge the concentration of light at the solar power tower manually with the human eye. Utilizing this approach, alignment and focus of each mirrored facet in the heliostat is "tweaked" until a technician judges (qualitatively) whether a sufficient focus of flux has been achieved at the solar power tower. For solar power tower fields that include hundreds or thousands of heliostats, this approach is suboptimal due to the time required to manually align mirrored facets in all heliostats; the changing sun position affects the flux distribution, which makes it difficult to accurately judge a "good" flux distribution at the collector. Other approaches have also been considered (and implemented and/or demonstrated), but such approaches are generally relatively expensive, inaccurate, difficult to use, or too time consuming to practically implement.

SUMMARY

The following is a brief summary of subject matter that is described in greater detail herein. This summary is not intended to be limiting as to the scope of the claims.

Described herein are various technologies pertaining to aligning (canting) and focusing mirrored facets in heliostats that are utilized in connection with concentrating solar radiation at a collector on a solar power. A target and a camera (e.g., a video camera or still camera) are positioned relative to a heliostat that comprises a plurality of mirrored facets, such that the camera can capture a reflected image of the target by way of the plurality of mirrored facets. The target may have known dimensions and is positioned at a measured or known distance from the heliostat. Additionally, orientation of the target with respect to the heliostat can be known, measured, or estimated. In other words, the camera is orientated towards the mirrored facets of the heliostat such that images of the mirrored facets of the heliostat are captured, and the target is placed such that from the images captured by the camera include the target as reflected by the mirrored facets of the heliostat.

In an exemplary embodiment, the camera can be positioned near the top of a solar power tower and directed toward a particular heliostat from amongst a plurality of heliostats. A target may be placed relatively proximate to the heliostat in between the tower and the heliostat. For instance, the target may be placed upon a frame of another heliostat in the field of heliostats. In this exemplary embodiment, the camera can capture images that include an entirety of a heliostat or several heliostats, such that all mirrored facets on one or more heliostats can be aligned substantially simultaneously. The target includes a plurality of reference markings. Therefore, for example, the target may be in the form of a grid that includes numerous lines: e.g., a first set of lines that run substantially vertically in parallel with one another and a second set of lines that run substantially horizontally in parallel with one another. Intersection points of the sets of lines in the target, size of lines in the target, and orientation of the lines in the target can be utilized to align the mirrored facets in a heliostat. One or more images of the target reflected by the mirrored facets of the heliostat as captured by the camera may then be provided to a computing apparatus. For example, the camera may be configured with an antenna that facilitates wireless communication of the image to the computing apparatus. Alternatively, the video camera may be coupled to the computing apparatus by way of a suitable wireline connection.

A theoretical image of the target as reflected by the heliostat can be generated at the computing apparatus based at least in part upon known dimensions of the target and mirrored facets of the heliostat, distance between the mirrored facets and the target, and orientation of the mirrored facets with respect to the target. The theoretical image is indicative of, for example, position, size, and orientation of gridlines of the target as reflected in the plurality of mirrored facets of the heliostat when such mirrored facets are properly aligned and focused. For example, the theoretical image can include computed points where gridlines of the target theoretically should intersect with one another in mirrored facets of the heliostat, positions on the mirrored facet where gridlines should intersect the boundaries of the mirrored facet, width of gridlines in the mirrored facet, and the like. The theoretical image can be compared with the actual image captured by the camera at the computing apparatus, and an instruction pertaining to aligning at least one mirrored facet in the heliostat can be output based at least in part upon the comparison between the theoretical image and the image captured by the camera. This instruction may be, for example, a visual instruction to a technician pertaining to an alteration in alignment or focus of at least one mirrored facet in the heliostat. In another example, the output instruction may be a textual instruction to a technician that instructs a technician as to a change in position of a bolt that causes an alteration in alignment or focus of at least one mirrored facet on the heliostat. In yet another embodiment, the instruction output by the computing apparatus may be transmitted to an actuator on the heliostat that causes the actuator to automatically change alignment and/or focus of at least one mirrored facet on the heliostat.

The above exemplary embodiment has described the utilization of a reflected image of a target when a heliostat is in the field. It is to be understood that reflected images may be captured in other manners. Pursuant to an example, the target itself (near the heliostat) may have one or more cameras attached thereto, and may be or directed towards the mirrored facets of a heliostat. This approach can employ several cameras, wherein a number of cameras may be dependent upon a distance between the target and mirrored facets of the heliostat of interest, a size of the heliostat (a number of mirrored facets in the heliostat), etc. The one or more cameras coupled to the target are configured to capture reflected images of the target via the mirrored facets of the heliostat. If a plurality of cameras are utilized in this approach, resulting images in an exemplary embodiment can be stitched together to create an overall image of the target as reflected via the mirrored facets of the heliostat. Alternatively, different mirrored facets on the heliostat can be analyzed separately through utilization of captured images of respective portions of the target reflected via the mirrored facets of the heliostat. Based at least in part upon a known distance between the mirrored facets of the heliostat and the target and known dimensions corresponding to the target, a theoretical image can be generated that is indicative of a reflected image of the target via the mirrored facets of the heliostat if the mirrored facets are properly aligned. This theoretical image can be compared with one or more images captured by the cameras that are coupled to the target and, as described above, a computing apparatus can be configured to output an instruction based at least in part upon the comparison.

Other aspects will be appreciated upon reading and understanding the attached figures and description.

DETAILED DESCRIPTION

Figure 1:
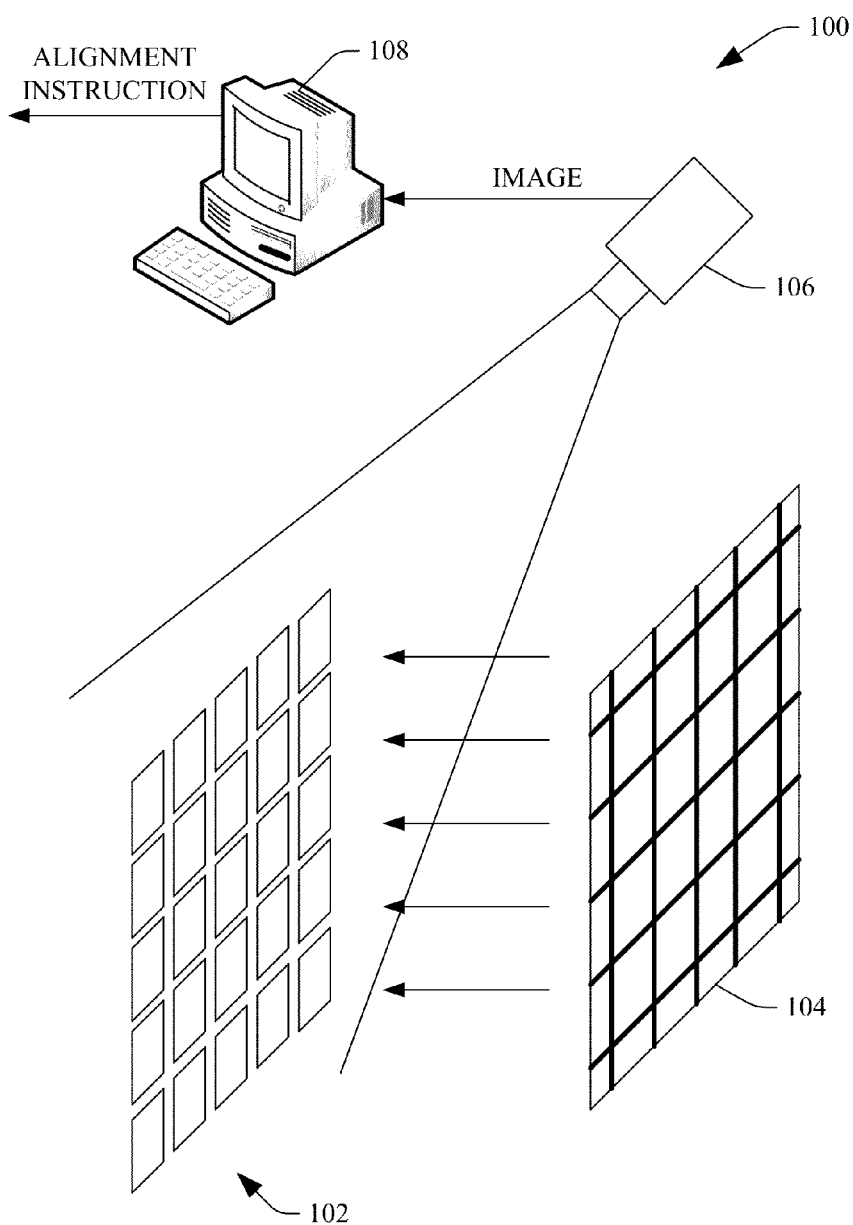
FIG. 1 illustrates a system that facilitates aligning mirrored facets in a heliostat.

Various technologies pertaining to aligning mirrored facets of heliostats utilized in connection with solar power towers will now be described with reference to the drawings, where like reference numerals represent like elements throughout. Additionally, as used herein, the term "exemplary" is intended to mean serving as an illustration or example of something, and is not intended to indicate a preference.

With reference now to FIG. 1, an exemplary system 100 that facilitates aligning mirrored facets of a heliostat is illustrated. The system 100 comprises a heliostat 102 that includes a plurality of mirrored facets. For example, in operation, the heliostat 102 comprises a frame that holds the plurality of mirrored facets, and the frame may be configured with two axis drives such that the heliostat 102 can track the movement of the sun over the course of a day. The heliostat 102, in operation, is configured to reflect solar radiation received at the mirrored facets towards a central collector on a solar power tower. Generally, hundreds or thousands of heliostats are positioned proximate to a solar power tower such that a significant amount of solar radiation is concentrated at the collector on the solar power tower. The solar radiation captured by the concentrator utilizes heat energy, for instance, to heat a liquid to transform the state of the liquid to a gas and drive a turbine. This in turn can be utilized to generate utility-grade electrical power.

To substantially optimize the concentration of solar flux at the concentrator of the solar power tower, the plurality of mirrored facets in the heliostat 102 are desirably aligned and/or focused. More specifically, when the plurality of mirrored facets and heliostats become misaligned with one another or out of focus, the solar radiation reflected by the plurality of mirrored facets is less concentrated at the collector of the solar power tower, thereby resulting in loss of heat, which results in less efficiency in connection with generating electric power.

To facilitate aligning the plurality of mirrored facets, the system 100 comprises a target 104 that is positioned to face the plurality of mirrored facets of the heliostat 102. For instance, as shown, the target 104 can include a reference grid that comprises a first plurality of lines that are arranged substantially vertically and a second plurality of lines that are arranged substantially horizontally. While the target 104 is shown as including the reference grid, it is to be understood that the target 104 may include other reference markings, such as diagonal lines, "X" markings, circles, or the like. Regardless of the type of reference markings that are included in the target 104, dimensions corresponding to size of the target 104 and reference markings in the target 104 can be known or measured. Further, a distance between the target 104 and the heliostat 102 can be measured or known a priori. Additionally, orientation of the heliostat 102 with respect to the target 104 can be known or measured. In more detail, azimuth angles with respect to a reference point can be measured or known for both the heliostat 102 and the target 104. Additionally, elevation (tilt) angles can be measured or known for both the heliostat 102 and the target 104.

A camera 106 can be positioned to capture a reflected image of the target 104 by way of the mirrored facets of the heliostat 102. In other words, the camera 106 is positioned to capture an image of the heliostat 102, and thereby capturing a reflected image of the target 104 in the plurality of mirrored facets of the heliostat 102. Pursuant to an example, the camera 106 may be a video camera that is configured to output or capture video images of the heliostat 102. In another exemplary embodiment, the camera 106 may be configured to capture still images of the target 104 as reflected from the mirrored facets of the heliostat 102. Additionally, the orientation of the camera 106 with respect to the heliostat 102 can be known or measured.

A computing apparatus 108 is in communication with the camera 106 and can receive an image of the reflected target 104 by way of the heliostat 102. For example, the camera 106 may be configured with wireless communication functionality that causes an image captured by the camera 106 to be transmitted by way of a wireless communications channel to the computing apparatus 108. In another exemplary embodiment, the camera 106 may be in communication with the computing apparatus 108 by way of a wirelined connection. In yet another exemplary embodiment, the camera 106 and the computing apparatus 108 may be integrated in a single computing device. The computing apparatus 108 is configured to generate a theoretical image of the target 104 as reflected by the mirrored facets of the heliostat 102 based at least in part upon the distance between the heliostat 102 and the target 104, the orientation of the heliostat 102 with respect to the target 104, the orientation of the camera 106 with respect to the target, and/or an ideal shape (focus) of the heliostat 102 (and mirrored facets therein), which is based upon a specified/assumed sun position and a theoretical aim point on a solar power tower. In an example, the computing apparatus 108 can receive a reflected image of the target 104 from the camera 106, and can include image processing functionality that is configured to identify boundaries of mirrored facets in the heliostat 102. This can be undertaken, for example, by analyzing intensity gradients in pixels of an image captured by the camera 106, where large gradient values may be indicative of a boundary of a mirrored facet.

Once the mirrored facets in the image captured by the camera 106 have been located, the computing apparatus 108 can be configured to generate a theoretical image of the reflected target 104 in the mirrored facets of the heliostat 102. The theoretical image of the reflected target 104 in the mirrored facets of the heliostat 102 can include reference points that are indicative of positions of the target as reflected by the mirrored facets of the heliostat 102 if such mirrored facets are substantially optimally aligned and/or focused. These reference points may include, for example, a position of intersection of gridlines of the target 104 as reflected in a particular mirrored facet, a position where at least one gridline in the reflected image of the target 104 ideally intersects a boundary of the particular mirrored facet, a width of at least one gridline as reflected by the particular mirrored facet as it crosses the mirrored facet, amongst other reference points. These reference points themselves may be interpreted to be the theoretical image. In an alternative embodiment, the computing apparatus 108 can generate the theoretical image of the reflected target 104 in the mirrored facets of the heliostat 102 prior to the camera 106 capturing the image, and the reference points of the theoretical image can be mapped to appropriate positions in the image captured by the camera 106 after such image is captured.

The computing apparatus 108 is also configured with computer-executable code that causes the image captured by the camera 106 to be compared with the theoretical image generated by the computing apparatus 108. An alignment and/or focus instruction pertaining to at least one facet can be output by the computing apparatus 108 based at least in part upon such comparison. In an exemplary embodiment, the computing apparatus 108 may have a display screen corresponding thereto, wherein the display screen depicts visual or textual instructions to a technician that is aligning or focusing a heliostat. Thus, the computing apparatus 108 may be a desktop computer that is employed in a factor setting where the heliostat 102 is manufactured. In another example, the computing apparatus 108 may be a portable computing device, such as a laptop computer, portable telephone, or the like, and can be utilized by a technician in the field in connection with aligning/focusing mirrored facets of the heliostat. In this case, the portable computing device is in wireless communication with the camera 106, and has sufficient computing resources to generate the above-described theoretical image. The instruction output by the computing apparatus 108 to the technician may be an overlay image that visually guides the technician when adjusting/focusing mirrored facets in the heliostat 102. Additionally or alternatively, the instruction output by the computing apparatus 108 to the technician may be textual instructions that describe actions to be undertaken by the technician to properly align/focus on or more mirrored facets of the heliostat 102.

In another exemplary embodiment, the computing device 108 can be in communication with another computing apparatus (not shown) that is utilized by a technician that is manually adjusting the alignment and/or focus of the plurality of mirrored facets in the heliostat 102. In such an example, the alignment/focus instruction is transmitted from the computing apparatus 108 to the other computing apparatus utilized by the technician. Again, the output instruction may be textual instructions informing the technician of particular alterations in alignment/focus to be undertaken with respect to at least one mirrored facet in the heliostat 102. In another exemplary embodiment, the computing apparatus 108 can be configured to transmit the image captured by the camera 106 to the computing technician together with visual overlays that pertain to the reference points in the theoretical image, wherein the visual overlays indicate substantially optimal positions of reference points in the target 104 as reflected by the at least one mirrored facet.

In still yet another exemplary embodiment, alignment/focus of mirrored facets in a heliostat can be automatically undertaken without a technician. In such an embodiment, actuators may be coupled to each of the mirrored facets, wherein the actuators can be in communication with a microprocessor on the heliostat 102. For instance, the microprocessor on the heliostat can be the computing apparatus 108 or be in wireless communication with the computing apparatus 108, and the output instruction can be transmitted (e.g., wirelessly) to the microprocessor. The microprocessor may then send commands to an appropriate actuator to cause, for instance, a fastening mechanism to be adjusted and thereby update alignment and/or focus of the at least one mirrored facet.

In an example, each mirrored facet may be coupled to the frame of the heliostat 102 by way of a plurality of fastening mechanisms, wherein such fastening mechanisms are adjustable, and adjustments to the fastening mechanisms cause alignment or focus of the respective mirrored facet to be altered. Therefore, for instance, adjusting a fastening mechanism on an upper portion or lower portion of a mirrored facet can cause the elevation angle of the mirrored facet to be changed, while adjusting a fastening mechanism on one of the sides of the mirrored facet can cause the azimuth angle of the mirrored facet to be altered. Additionally, adjusting a particular fastening mechanism proximate to a center of the mirrored facet can cause a focus of the mirrored facet to change.

With respect to the exemplary target 104 shown in FIG. 1, when captured as a reflected image by the camera 106 via the heliostat 102, the intersections of lines in the reference grid desirably correspond to each of the mirrored facets in the heliostat 102. Accordingly, for any row of mirrored facets in the heliostat 102, a reflected image of the target 104 will desirably include a horizontal grid line that passes horizontally through each mirrored facet in the row. Similarly, for any column of mirrored facets in the heliostat 102, the reflected image of the target 104 will desirably include a vertical grid line that passes vertically through each mirrored facet in the column. Misalignment in the reflected image of a grid line in the vertical direction between two mirrored facets in a column indicates a misalignment of at least one of the mirrored facets in the column with respect to the azimuth angle, while misalignment in the reflected image of a grid line in the horizontal direction between two mirrored facets in a row indicates a misalignment of at least one of the mirrored facets in the column with respect to the elevation angle. By comparing the reflected image of the target 104 captured by the camera 106 with the theoretical reflected image of the target 104, such misalignments in the elevation and azimuth angles can be located. Moreover, a width of either a vertical or horizontal grid line of the target 104 as reflected by a mirrored facet of the heliostat 102 is indicative of focus corresponding to the mirrored facet. The comparison between the image captured by the camera 106 and the theoretical image can result in identification of improper focus of the mirrored facet.

Figure 2:
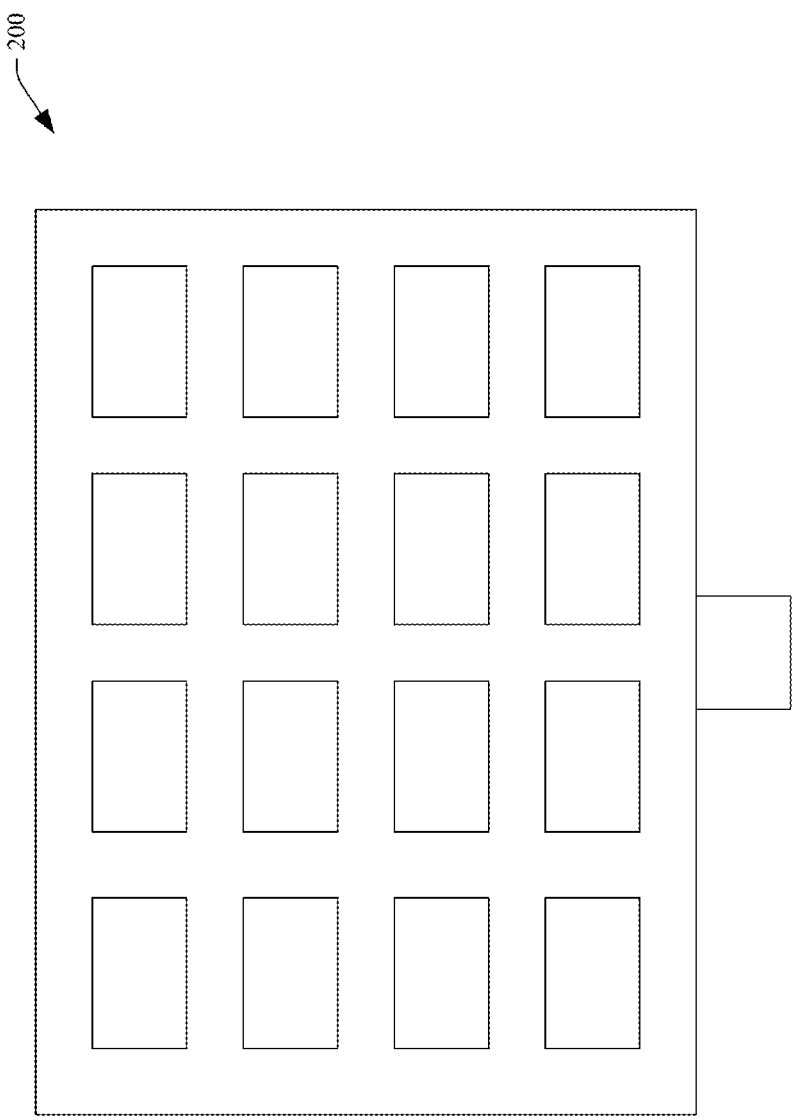
FIG. 2 illustrates an exemplary target that can be utilized in connection with aligning mirrored facets in a heliostat.

With reference now to FIG. 2, an exemplary target 200 that can be utilized in connection with aligning mirrored facets in a heliostat as described above is illustrated. In this example, the target 200 may be a frame that is utilized to support another mirrored facet, which for instance, may be in a solar power tower field together with the heliostat 102. Therefore, in an example, the target 200 shown in FIG. 2 may be utilized as the target 104 described above. The frame of the heliostat includes a plurality of vertically arranged support beams and a plurality of horizontally arranged support beams that are utilized to support mirrored facets of the heliostat. Pursuant to an example, to increase visibility, one or more of the vertically arranged or horizontally arranged support beams may be painted or taped with a reflective paint or tape to cause the support beams to be readily identifiable in images. Utilization of a frame of a heliostat as the target 104 may be beneficial, as dimensions of the frame are already known and a position between the frame and another heliostat in the solar power tower field are likewise known. Additionally, orientation of both the heliostat being aligned and the heliostat that is acting as a target can be known a priori.

Since both of such heliostats can be configured to generally be directed towards the central collector on the solar power tower, it is to be understood that the frame of the heliostat can be utilized as a target while both are in the field. In an exemplary embodiment, the frames of the heliostats can be pulled off sun and placed in substantial alignment with the camera 106 to enable alignment of mirrored facets of one of the heliostats. In another exemplary embodiment, the target 102 can be constructed separately, placed on a mobile cart, and positioned relative to heliostats in the field to perform alignment. In still yet another exemplary embodiment, a heliostat frame or separately constructed target can be utilized as the target 104 to perform alignment of mirrored facets in a factory setting, such that the target 104 can be positioned relative to a heliostat that has recently been manufactured (or is in a factory for maintenance purposes), and alignment of mirrored facets of the heliostat can be undertaken through utilization of the theoretical image as described above. While the target 200 has been described as possibly being a frame of a heliostat, it is to be understood that any suitable mechanism that can be utilized as a target is contemplated by the inventors and intended to fall under the scope of the hereto-appended claims.

Figure 3:
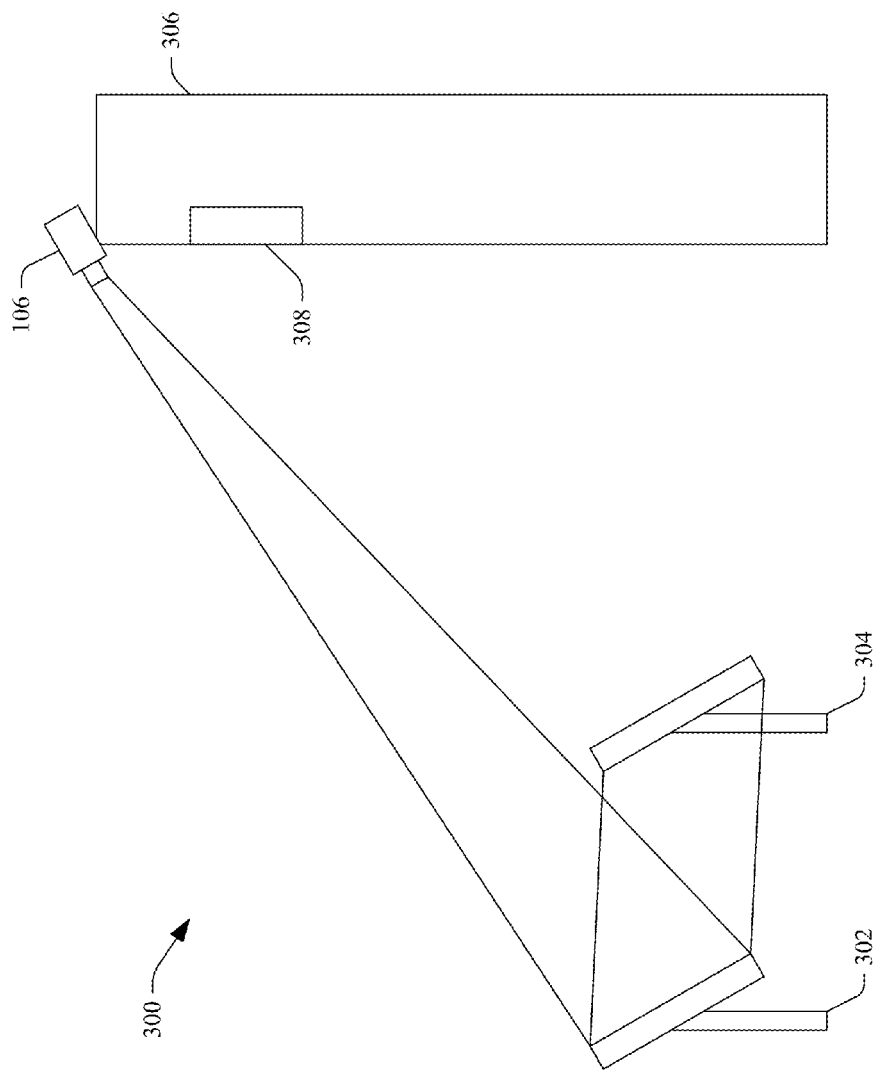
FIG. 3 illustrates an exemplary system that facilitates aligning heliostats in a solar power tower field.

Turning now to FIG. 3, an exemplary system 300 that facilitates aligning mirrored facets of a heliostat is illustrated. The system 300 comprises a plurality of heliostats 302-304, wherein each of the heliostats comprises an array of mirrored facets. The system 300 further comprises a solar power tower 306 that includes a central collector 308. The mirrored facets on the heliostats 302-304 are configured to direct concentrated light to the central collector 308 on the solar power tower 306 when the heliostats are "on sun". The system 300 further comprises the camera 106 that is placed near the top of the solar power tower 306. In this exemplary system 300, the frame of the heliostat 304 acts as the target 104, and the mirrored facets on the heliostat 302 are desirably aligned and/or focused. The camera 106 captures a reflected image of the target by way of the mirrored facets of the heliostat 302 as described above. This captured image of the reflected target (the frame of the heliostat 304) is then compared with a theoretical reflected image of the target when the mirrored facets of the heliostat are substantially optimally aligned/focused.

The system 300 facilitates efficient in situ alignment of mirrored facets in heliostats in a solar power tower field. As mentioned above, solar power tower fields may include hundreds or thousands of heliostats. To align mirrored facets in heliostats, the camera 106 can be directed towards a particular heliostat that includes mirrored facets that are desirably aligned. Pursuant to an example, the camera 106 includes a zoom lens that is configured to capture the heliostat 302 in its field of view. Additionally, prior to the camera 106 capturing a reflected image of the frame of the heliostat 304 by way of the mirrored facets of the heliostat 302, both of the heliostats 302 and 304 can be rotated such that they are in line with the camera 106. Subsequent to the heliostats 302 and 304 being in line with the camera 106, the camera 106 can capture a reflected image of the target (the frame of the heliostat 304) by way of the mirrored facets of the heliostat 302, and can transmit this captured image to the computing apparatus 108. Since the distance between the heliostat 302 and the heliostat 304 are known, and orientation of the heliostats 302-304 are known with respect to one another, and the orientation of the camera 106 with respect to the heliostat 302 is readily computable (or measured via a encoders on the heliostat drives), a theoretical image of the frame of the heliostat 304 as reflected in the mirrored facets of the heliostat 302 can be generated. As mentioned above, this theoretical image can be generated prior to the camera 106 capturing the reflected image of the target in the mirrored facets of the heliostat 302 or after the camera 106 has captured the reflected image of the target in the mirrored facets of the heliostat 302. If the orientation of the heliostat 302 is unknown with respect to the heliostat 304, photogrammetry can be employed to calculate the orientation of the target (the frame of the heliostat 304) relative to the mirrored facets of the heliostat 302, and a sun position can be assumed to calculate correction factors to fix the aligning of the mirrored facets as well as focus, such that when the heliostat 302 is put on sun, the radiation beams reflected by the heliostat 302 are well focused. Again, subsequent to the computing apparatus 108 comparing the received image from the camera 106 with the theoretical image, one or more instructions can be output that indicate desired alterations in alignment and/or focus of at least one mirrored facet in the heliostat 302.

It can be observed that a heliostat in a front row or at outer edges of a solar power tower field do not have heliostats directly in front thereof. Accordingly, for these heliostats, a portable target can be utilized and placed in between such heliostats and the solar power tower 306 (and the camera 106). Such a portable target may include a reference grid as described above. A distance between the portable target and the desirably aligned heliostat can be measured and photogrammetry can be employed to calculate the difference in orientation between the portable target and the desirably aligned heliostat. Thereafter, the process of computing the theoretical image and capturing the reflected image of the target through the desirably aligned heliostat will be undertaken as described above.

In another exemplary embodiment, rather than the target being placed proximate to a desirably aligned heliostat, a target may be placed relatively high on the tower but beneath the camera 106. In such an exemplary embodiment, the desirably aligned heliostats can be configured such that the camera 106 can capture a reflected image of the target on the solar power tower 306 in numerous heliostats in a single image. It is to be understood, however, that the target for desirably aligned heliostat can be positioned at any suitable location in between the camera 106 and the desirably align heliostats, so long as the camera 106 can capture a reflected image of the target by way of mirrored facets of the desirably aligned heliostats.

Figure 4:
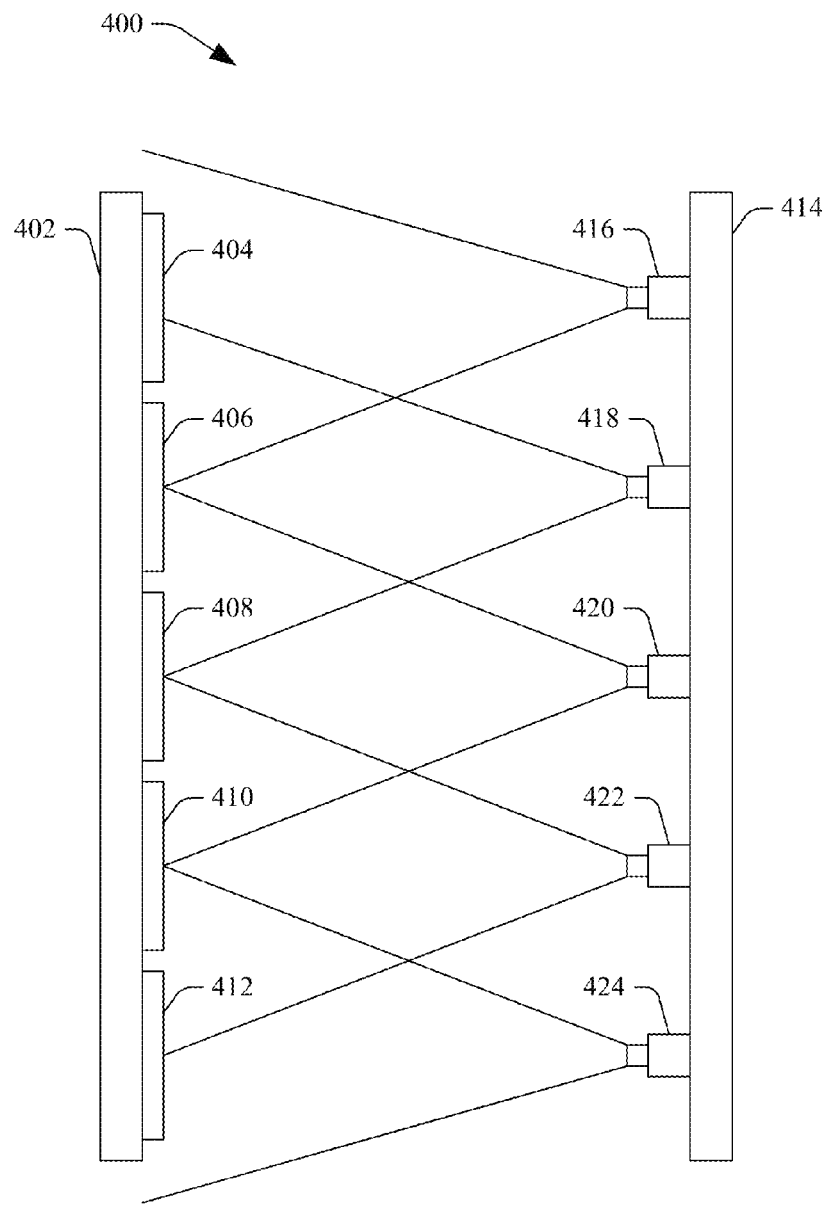
FIG. 4 illustrates an exemplary system that facilitates aligning mirrored facets of a heliostat through utilization of a reflected image of a target.

With reference now to FIG. 4, another exemplary system 400 that facilitates aligning mirrored facets on a heliostat is illustrated. The system 400 may be particularly beneficial during manufacture of a heliostat, prior to such heliostat being placed in a field of a solar power tower. The system 400 comprises a heliostat 402 that includes a plurality of mirrored facets 404-412. The system 400 further comprises a (mobile) target 414 which can include reference markings (e.g., a reference grid) as described above. Additionally, a plurality of cameras 416-424 can be mounted to the target 414 and directed at the mirrored facets 404-412 of the heliostat 402. A number and position of cameras can depend upon, for instance, size of mirrored facets 404-412 and number of mirrored facets in the heliostat 402. Pursuant to a particular example, the plurality of cameras 416-424 can be positioned at corners of the target 414 with a single camera placed at a center of the target 414. Reference markings on the target 414 are captured by the cameras 416-424 as reflected in the mirrored facets 404-412 of the heliostat 402. A single camera may cover several adjacent mirrored facets, such that an image from one of these cameras can be utilized to align and focus several mirrored facets. The orientation of the target 414 relative to that of the heliostat 402, the desired slant angle of the mirrored facets 404-412, distance between the cameras 416-424 and/or the target structure 414 and the mirrored facets 404-412 of the heliostat 402, and orientations of the cameras 416-424 relative to a reference camera (e.g., a boresight camera which may be a center camera) are used to calculate theoretical images that indicate ideal alignment and/or focus of the mirrored facets 404-412. Pursuant to an example, theoretical images can be overlaid on photographic images captured by the cameras 416-424.

In the approach exemplified in the system 400, a subset of the mirrored facets 404-412 in heliostat 402 can be aligned based upon images captured by a particular camera. In another exemplary embodiment, images captured by the cameras 416-424 can be stitched together through conventional image stitching techniques, such that a stitched image of reflections of the target by way of the mirrored facets 404-412 can be created and compared with a theoretical image. Thereafter, reference markings can be overlaid on top of the captured image to guide a technician in connection with adjusting alignment/focus of the mirrored facets 404-412 of the heliostat 402.

Figure 5:
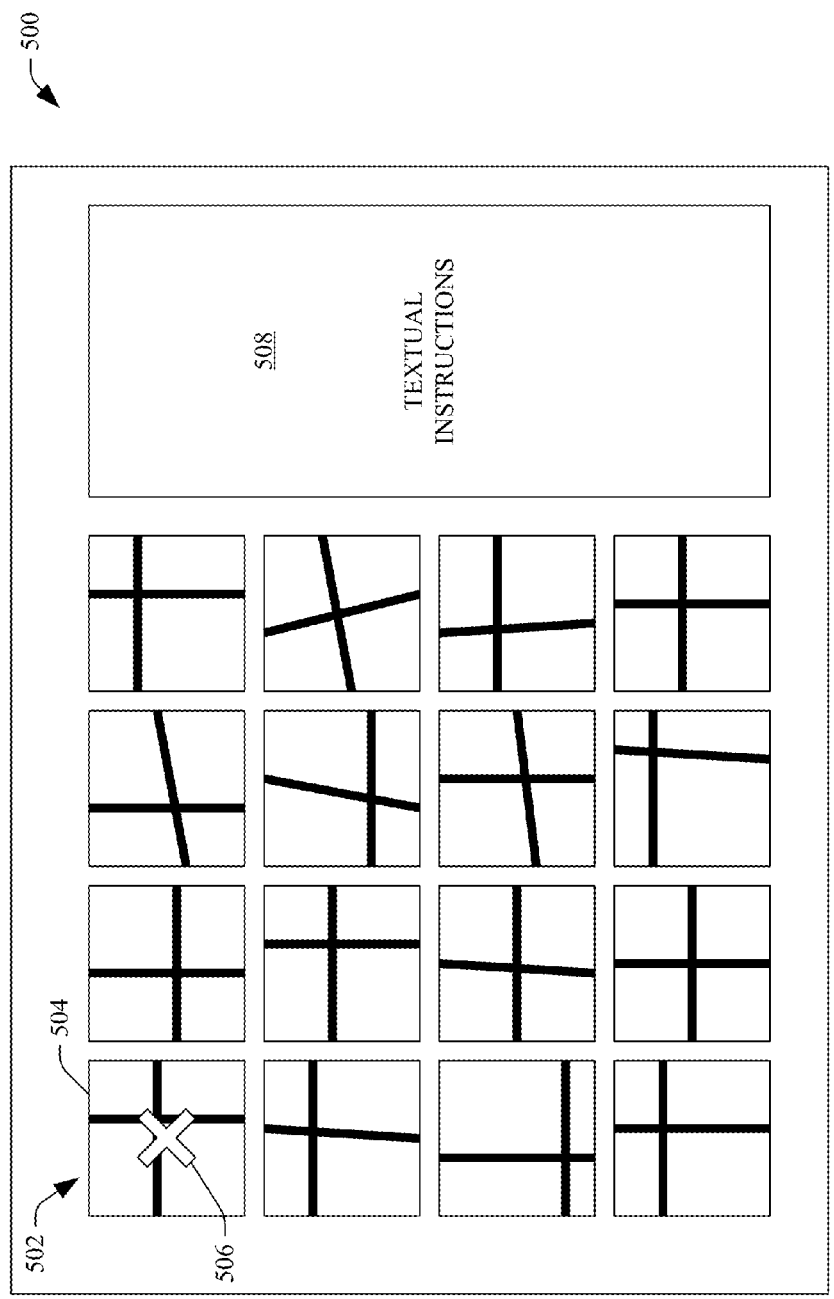
FIG. 5 illustrates an exemplary graphical user interface that facilitates aligning mirrored facets in a heliostat.

With reference now to FIG. 5, an exemplary graphical user interface 500 that can be provided to a technician in connection with adjusting alignment and focus of mirrored facets in heliostats is illustrated. The graphical user interface 500 can be displayed on a display monitor that is viewable to a technician, wherein the display monitor can be a display monitor on a portable computing device, a conventional display monitor, or the like. The graphical user interface 500 includes an image captured by the camera 106 of the target by way of the mirrored facets of a heliostat. In the exemplary graphical user interface 500, images corresponding to sixteen separate mirrored facets on a heliostat are shown. It is to be understood that this number of mirrored facets is exemplary, and more or fewer mirrored facets can be shown in the graphical user interface 500. In the exemplary graphical user interface 500, the reflected target image in the mirrored facets includes a reference grid that comprises a plurality of vertically arranged reference lines and a plurality of horizontally arranged reference lines. It is to be understood that a reflected vertically arranged reference line is desirably in alignment through mirrored facets in a column while a reflected horizontally arranged reference line is desirably in alignment through mirrored facets in a row. In the example shown in FIG. 5, it can be ascertained that the imaged mirrored facets are out of alignment.

As described above, a theoretical image that includes theoretical reference points can be generated and such reference points can be overlaid on the captured image of the mirrored facets that display a reflected image of the target reference grid. For instance, the theoretical reference point may indicate a desired position in the reflected image of the target on a particular mirrored facet where grid lines intersect. Accordingly, with respect to a first mirrored facet 504 shown in the graphical user interface 500, a marker 506 can be or overlaid on the image of the target as reflected from the first mirrored facet 504 to indicate to a technician a desired alteration in alignment of the first mirrored facet. While just a single marker has been shown for the purposes of explanation, it is to be understood that markers similar to the one shown as marker 506 can be placed on all of the mirrored facets shown in the graphical user interface 500. Moreover, additional reference markings may be included in the image of the first facet 504, such as markings to indicate where the grid lines desirably intersect the boundary of the mirrored facet 504, a desired width of grid lines as they pass through the mirrored facet 504, etc. Again, a technician can view the reference marker 506 in connection with the reflected target grid lines in the graphical user interface 500, and can make modifications to alignment and/or focus of the mirrored facet 504 to cause the reflected grid lines to correspond to the reference marker 506. This can be undertaken for each of the mirrored facets shown in the graphical user interface 500 until all such mirrored facets are desirably aligned.

Additionally or alternatively, the graphical user interface 500 may include a field 508 that presents textual instructions to a technician that is aligning and/or focusing one or more mirrored facets in a heliostat. These textual instructions can be provided together with or independent of the images shown in the graphical user interface 500. For instance, the textual instructions shown in the field 508 can inform a technician of an identity of a fastening mechanism that can be adjusted to alter alignment of a particular mirrored facet as well as a manner in which to adjust the fastening mechanism to update alignment. An exemplary textual instruction may be "turn alignment bolt #3 clockwise three rotations."

Figure 6:
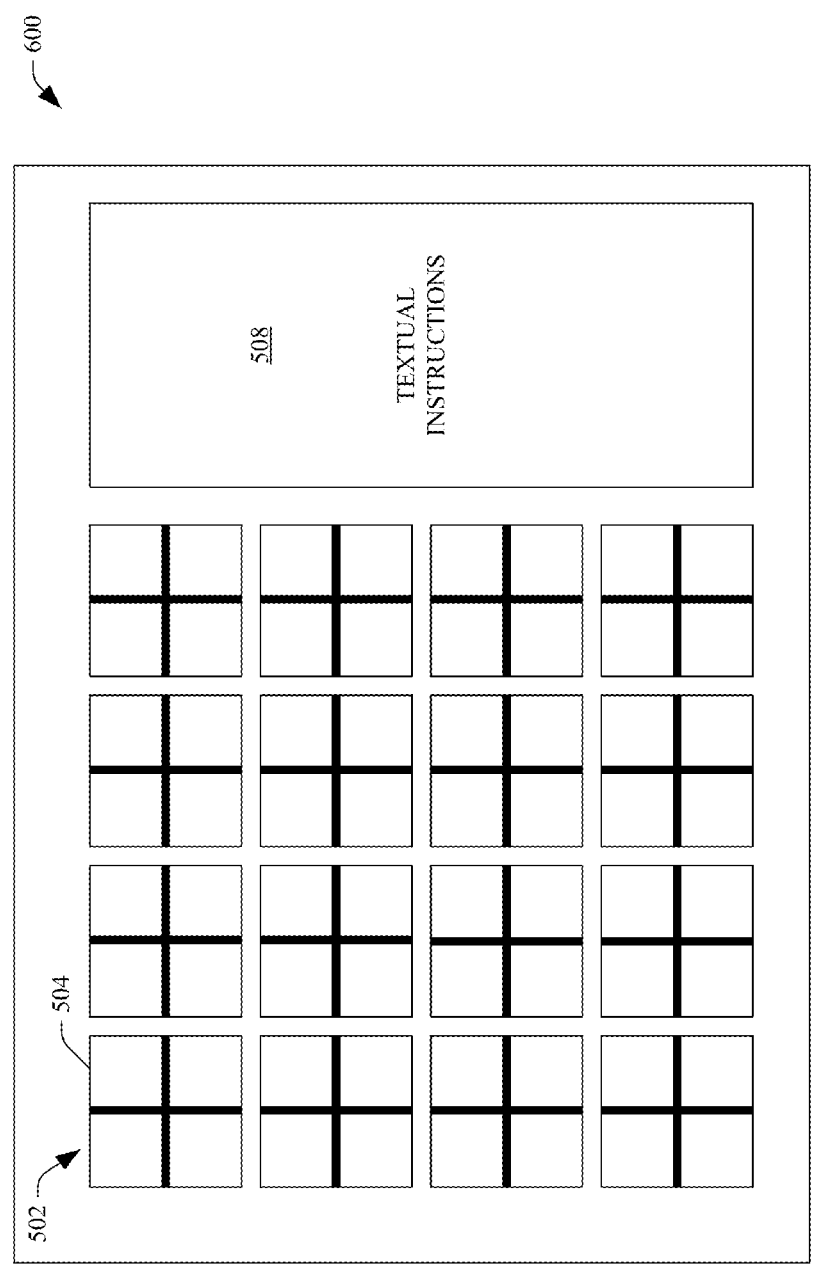
FIG. 6 illustrates an exemplary graphical user interface that facilitates confirming that mirrored facets in a heliostat have been aligned.

Now referring to FIG. 6, another exemplary graphical user interface 600 is shown. The graphical user interface 600 illustrates reflected images of the target grid lines captured through mirrored facets of the heliostat after the mirrored facets have been properly aligned. It can be ascertained that vertically arranged grid lines are substantially aligned across mirrored facets in a column, while horizontally arranged grid lines are substantially aligned across mirrored facets in a row. For instance, once the technician ascertains that the mirrored facets are in substantial alignment through analysis of the graphical user interface 600, the technician can proceed to align a different heliostat.

Figure 7:
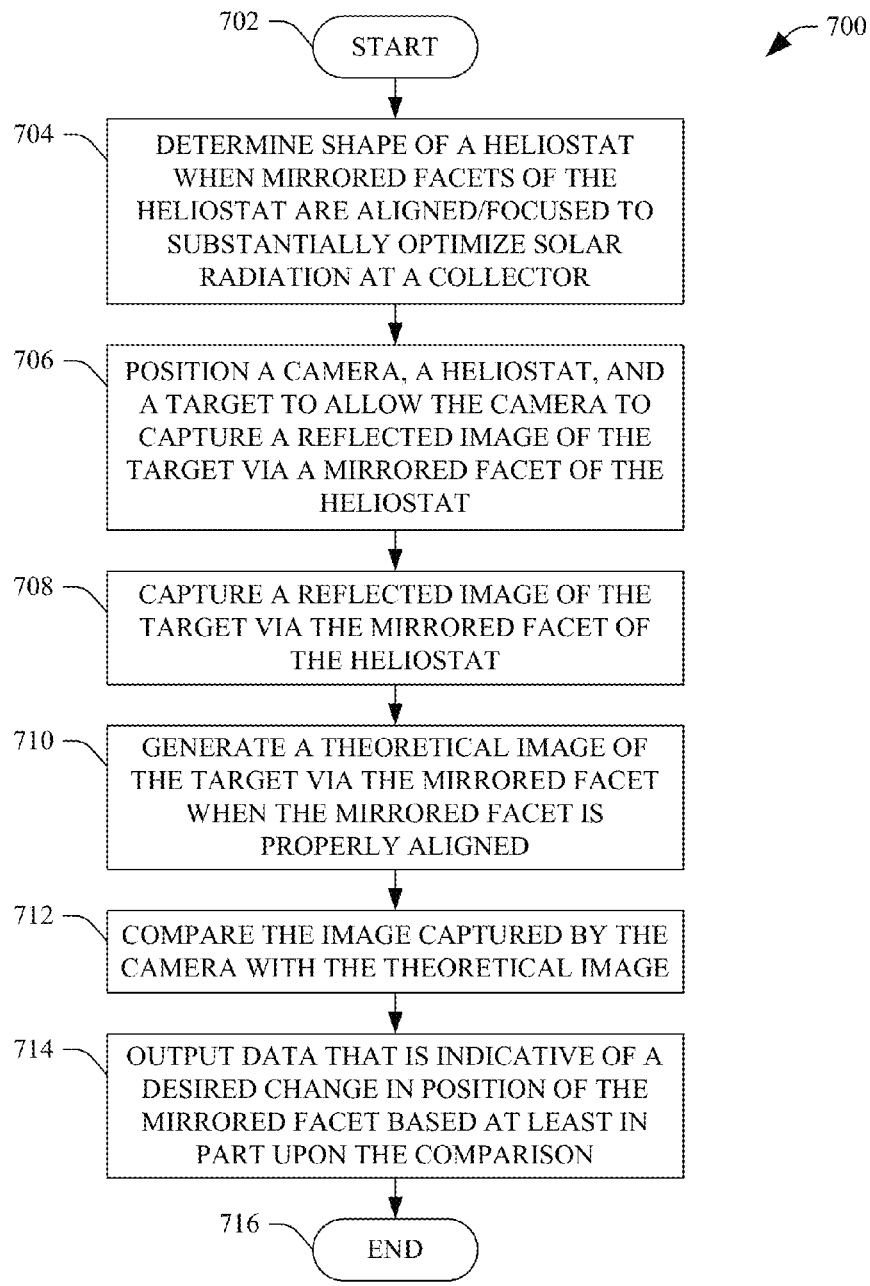
FIG. 7 is a flow diagram that illustrates an exemplary methodology for outputting data that is indicative of a desired change in alignment or focus of a mirrored facet.
Figure 8:
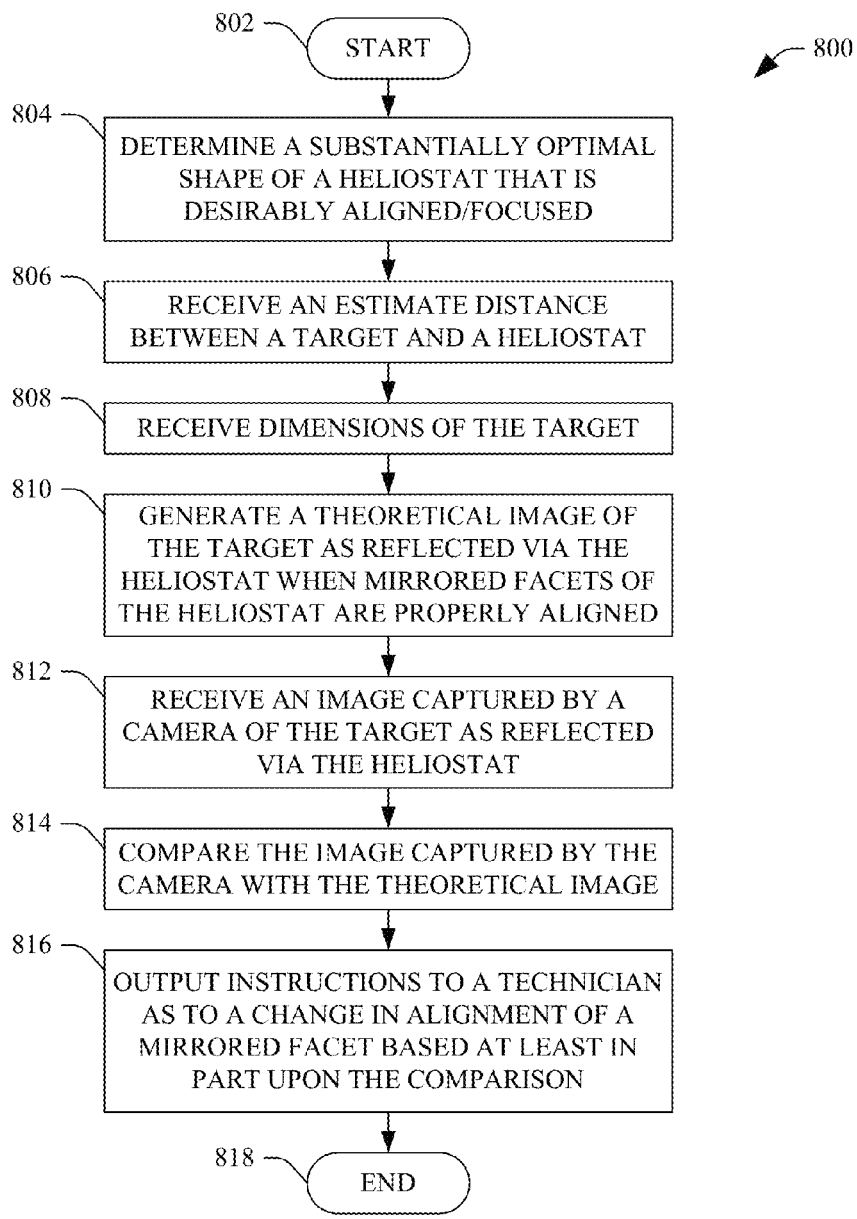
FIG. 8 is a flow diagram that illustrates an exemplary embodiment for outputting instructions to a technician as to change alignment or focus of a mirrored facet on a heliostat.

With reference now to FIGS. 7-8, various exemplary methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, one or more of the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like. The computer-readable medium may be a data storage medium, such as memory, hard drive, CD, DVD, flash drive, or the like. As used herein, the term "computer-readable medium" is not intended to encompass a propagated signal.

With reference now to FIG. 7, an exemplary methodology 700 that facilitates aligning mirrored facets based at least in part upon captured images of a target as reflected through the mirrored facets is illustrated. The methodology 700 starts at 702, and at 704 a shape of a heliostat that is desirably aligned/focused is determined, wherein the shape of the heliostat refers to positions (in both elevation and azimuth angles) of mirrored facets in the heliostat as well as slant angle (focus) of the mirrored facets in the heliostat when the mirrored facets are aligned to substantially optimize concentrate solar radiation at a collector of a solar power tower. The shape of the heliostat is determined based at least in part upon an assumed sun position (e.g., noon on the solar equinox) a position of the collector on the solar power tower, and a distance between the heliostat and the solar power tower. It is to be understood that any suitable sun position can be assumed, and that the sun need not be in the assumed position relative to the heliostat.

At 706, a camera, a heliostat, and a target are positioned to allow the camera to capture a reflected image of the target via a mirrored facet of the heliostat. At 708, a reflected image of the target is captured via at least one mirrored facet of the heliostat.

At 710, a theoretical reflected image of the target is generated, wherein the theoretical image may be computed reference points that indicate a desired position of reference lines in the theoretical image when the mirrored facet is properly aligned. The theoretical reflected image is based at least in part upon the shape of the heliostat determined at 702, the relative orientation of the heliostat to the target, the distance between the heliostat and the target, and the relative orientation of the camera to the target (or other camera).

At 712, the image captured by the camera is compared with the theoretical image, and at 714 data is output that is indicative of a desired change in position of the mirrored facet based at least in part upon the comparison. The desired change in position may cause alignment and/or focus of the mirrored facet to be altered. Pursuant to an example, this data may be an overlay of a reference marker on the image captured by the camera, may be a textual instruction to a technician, may be a command received by an actuator to alter alignment or focus of the mirrored facet, etc. The methodology 700 completes at 714.

Now referring to FIG. 8, an exemplary methodology 800 that facilitates aligning at least one mirrored facet of the heliostat is illustrated. The methodology 800 starts at 802, and at 804 a substantially optimal shape of a heliostat that is desirably aligned/focused is determined. The determining of shape of the heliostat has been described above. At 806 an estimated distance between a target and a heliostat is received. This estimated distance may be an actual measured distance. At 808, dimensions of the target are received. Additionally, orientation of the target with respect to a desirably aligned heliostat is computed or received.

At 810, a theoretical image of the target as reflected via the heliostat when mirrored facets of the heliostat are properly aligned is generated. At 812, an image captured by a camera of the target as reflected via the heliostat is received and at 814, an image captured by the camera is compared to the theoretical image. At 816, instructions are output to a technician as to a change in alignment or focus of the mirrored facet based at least in part upon the comparison undertaken at 814. The methodology completes at 818.

Figure 9:
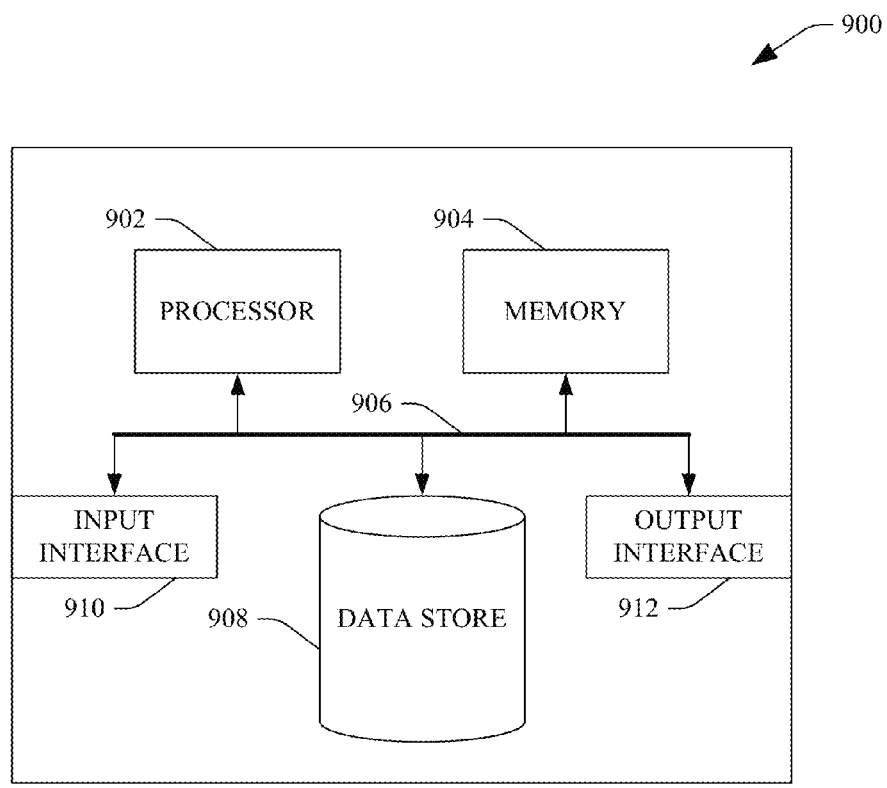
FIG. 9 is an exemplary computing system.

Now referring to FIG. 9, a high-level illustration of an exemplary computing device 900 that can be used in accordance with the systems and methodologies disclosed herein is illustrated. For instance, the computing device 900 may be used in a system that supports aligning/focusing mirrored facets of heliostats. In another example, at least a portion of the computing device 900 may be used in a system that supports generating a theoretical image of a reflected target via mirrored facets of a heliostat. The computing device 900 includes at least one processor 902 that executes instructions that are stored in a memory 904. The memory 904 may be or include RAM, ROM, EEPROM, Flash memory, or other suitable memory. The instructions may be, for instance, instructions for implementing functionality described as being carried out by one or more components discussed above or instructions for implementing one or more of the methods described above. The processor 902 may access the memory 904 by way of a system bus 906. In addition to storing executable instructions, the memory 904 may also store images, data indicative of orientation of heliostats and/or targets, data indicative of distance between heliostats and targets, etc.

The computing device 900 additionally includes a data store 908 that is accessible by the processor 902 by way of the system bus 906. The data store 908 may be or include any suitable computer-readable storage, including a hard disk, memory, etc. The data store 908 may include executable instructions, data indicative of distances between heliostats and targets, etc. The computing device 900 also includes an input interface 910 that allows external devices to communicate with the computing device 900. For instance, the input interface 910 may be used to receive instructions from an external computer device in a wireless manner, etc. The computing device 900 also includes an output interface 912 that interfaces the computing device 900 with one or more external devices. For example, the computing device 900 may display text, images, etc. by way of the output interface 912. Additionally, the computing device 900 may transmit signals wirelessly by way of the output interface 912.

Additionally, while illustrated as a single system, it is to be understood that the computing device 900 may be a distributed system. Thus, for instance, several devices may be in communication by way of a network connection and may collectively perform tasks described as being performed by the computing device 900.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A system, comprising:
   a heliostat that comprises a plurality of mirrored facets;
   a target that is positioned to face the plurality of mirrored facets;
   a camera that is positioned to capture a reflected image of at least a portion of the target by way of at least one mirrored facet from amongst the plurality of mirrored facets; and
   a computing apparatus that receives the reflected image of the at least the portion of the target from the camera, performs a comparison of corresponding reference points between the reflected image of the at least the portion of the target with a theoretical image of the at least the portion of the target, and outputs an instruction pertaining to alignment and focus of the at least one mirrored facet based at least in part upon the comparison.

2. The system of claim 1, further comprising a display monitor that displays the reflected image from the computing apparatus together with the instruction pertaining to alignment and focus of the at least one facet.

3. The system of claim 2, wherein the instruction is a visual overlay on the reflected image displayed on the display monitor.

4. The system of claim 2, wherein the instruction is a textual instruction describing at least one action to be undertaken by a technician to align and focus the at least one facet.

5. The system of claim 1, wherein the heliostat further comprises an actuator that is operative to alter alignment and focus of the at least one mirrored facet, and wherein the actuator is configured to receive, the instruction and automatically alter alignment and focus of the at least one mirrored facet responsive to receipt of the instruction.

6. The system of claim 1, further comprising a power tower that comprises a central collector, wherein the plurality of mirrored facets are configured to concentrate solar radiation to the collector, and wherein the power tower is configured to generate electricity based at least in part upon solar radiation received by the collector from the plurality of mirrored facets.

7. The system of claim 6, wherein the camera is placed on the power tower.

8. The system of claim 7, wherein the target is positioned on the power tower.

9. The system of claim 7, wherein the target comprises a frame of a second heliostat that is between the power tower and the first heliostat.

10. The system of claim 1, wherein the camera is positioned on the target.

11. The system of claim 1, wherein the instruction pertains to monitoring a focal point of the at least one mirrored facet.

12. The system of claim 1, wherein the camera is a video camera.

13. A method, comprising:
    positioning a target with respect to a heliostat that comprises a plurality of mirrored facets such that the plurality of mirrored facets reflect an image of the target;
    causing a camera to capture the image of the target as reflected from the plurality of mirrored facets;
    based at least in part upon an estimated distance between the plurality of mirrored facets and the target, generating a theoretical image of the plurality of mirrored facets when properly aligned;
    comparing a dimensional aspect of the image captured by the camera with a corresponding dimensional aspect of the theoretical image of the plurality of mirrored facets when properly aligned; and
    outputting data that is indicative of a desired change in alignment or focus of at least one mirrored facet in the plurality of mirrored facets based at least in part upon the comparing of the image captured by the camera with the theoretical image of the plurality of mirrored facets when properly aligned.

14. The method of claim 13, wherein the camera captures video of the target reflected from the plurality of mirrored facets, and further comprising:
    causing the video to be displayed in real-time together with the output data on a display screen of a computing device.

15. The method of claim 14, wherein the data is an image that overlays the video, wherein the image that overlays the video is indicative of a desired alteration in alignment or focus of the at least one mirrored facet.

16. The method of claim 13, wherein the data is textual instructions for altering alignment or focus of the at least one mirrored facet.

17. The method of claim 13, wherein the target comprises a frame of a second heliostat.

18. The method of claim 17, further comprising rotating at least one of the heliostat or the second heliostat to align the heliostat and the second heliostat with respect to line-of-sight of the camera prior to causing the camera to capture the image of the target as reflected from the plurality of heliostats.

19. The method of wherein the heliostat is oriented substantially vertically.

20. A computer-readable storage medium comprising instructions that, when executed by a processor, cause the processor to perform acts comprising:
    receiving an estimated distance between the desirably aligned heliostat and a target;
    receiving dimensions of the target;
    generating a theoretical image of the target as reflected by the heliostat when the plurality of mirrored facets are properly aligned based at least in part upon the estimated distance and the dimensions of the target and an assumed position of the sun;
    receiving an image captured by a camera of the target as reflected by the heliostat;
    comparing a dimensional aspect of the image captured by the camera with corresponding dimensional aspect of the theoretical image; and
    outputting instructions to a technician as to a change in alignment and focus of at least one facet from amongst the plurality of facets based at least in part upon the comparing of the image captured by the camera with the theoretical image.

* * * * *